(12) United States Patent
Farrow et al.

(10) Patent No.: US 8,072,751 B2
(45) Date of Patent: Dec. 6, 2011

(54) TOOL-LESS RETENTION SYSTEM FOR AN ELECTRONIC DEVICE

(75) Inventors: Timothy S. Farrow, Cary, NC (US); William F. Martin-Otto, Apex, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 181 days.

(21) Appl. No.: 12/412,540

(22) Filed: Mar. 27, 2009

(65) Prior Publication Data

US 2010/0246114 A1 Sep. 30, 2010

(51) Int. Cl.
*G06F 1/16* (2006.01)
*H05K 5/00* (2006.01)
*H05K 7/00* (2006.01)

(52) U.S. Cl. .................................................. 361/679.6

(58) Field of Classification Search ............... 361/679.6, 361/679.01, 679.02, 752, 759, 760
See application file for complete search history.

(56) References Cited

U.S. PATENT DOCUMENTS

| | | | | |
|---|---|---|---|---|
| 4,991,058 A * | 2/1991 | Watkins et al. | .......... | 361/679.41 |
| 5,051,868 A * | 9/1991 | Leverault et al. | .......... | 361/679.6 |
| 5,172,305 A * | 12/1992 | DeWilde | .......... | 361/796 |
| 5,734,551 A * | 3/1998 | Hileman et al. | .......... | 361/695 |
| 5,743,606 A * | 4/1998 | Scholder | .......... | 312/223.2 |
| 5,784,251 A * | 7/1998 | Miller et al. | .......... | 361/679.6 |
| 5,963,424 A * | 10/1999 | Hileman et al. | .......... | 361/695 |
| 5,973,918 A * | 10/1999 | Felcman et al. | .......... | 361/679.6 |
| 5,995,364 A * | 11/1999 | McAnally et al. | .......... | 361/679.31 |
| 6,097,591 A * | 8/2000 | Ircha | .......... | 361/679.6 |
| 6,115,250 A * | 9/2000 | Schmitt | .......... | 361/695 |
| 6,220,887 B1 * | 4/2001 | Downs | .......... | 439/377 |
| 6,349,029 B1 * | 2/2002 | Leman et al. | .......... | 361/679.57 |
| 6,353,541 B1 * | 3/2002 | Leman et al. | .......... | 361/809 |
| 6,356,438 B1 * | 3/2002 | Leman et al. | .......... | 361/679.4 |
| 6,430,041 B1 * | 8/2002 | Johnson et al. | .......... | 361/679.48 |
| 6,466,448 B1 * | 10/2002 | Baik | .......... | 361/752 |
| 6,530,628 B1 * | 3/2003 | Huang et al. | .......... | 312/223.2 |
| 6,587,342 B1 * | 7/2003 | Hsu | .......... | 361/695 |
| 6,813,156 B2 * | 11/2004 | Park | .......... | 361/725 |
| 7,046,517 B2 * | 5/2006 | Long et al. | .......... | 361/725 |
| 7,239,511 B2 * | 7/2007 | Collins et al. | .......... | 361/679.33 |
| 7,748,229 B2 * | 7/2010 | Gwin et al. | .......... | 62/259.2 |
| 7,760,500 B2 * | 7/2010 | Gwin et al. | .......... | 361/696 |
| 2005/0141188 A1 * | 6/2005 | Collins et al. | .......... | 361/685 |

* cited by examiner

*Primary Examiner* — Jinhee Lee
*Assistant Examiner* — Adrian S Wilson
(74) *Attorney, Agent, or Firm* — Ference & Associates LLC (57) ABSTRACT

The invention broadly contemplates a tool-less retention system that appropriately distributes load via various distributed load points to prevent damage caused to a computer by heavy adapter cards during shipping. At least one embodiment of the invention includes a tool-less retention system with a balanced distributed load point positioned to contact and transfer force to the computer chassis at a region with great resistance to warping.

18 Claims, 8 Drawing Sheets

TOOL-LESS RETENTION SYSTEM FOR AN ELECTRONIC DEVICE

FIELD OF THE INVENTION

The invention is directed to tool-less retention systems in electronic devices (e.g. workstation computers, "computers"). Specifically, the invention is directed to a tool-less retention system that achieves appropriate load balancing for retaining internal components of a computer in proper position.

BACKGROUND OF THE INVENTION

Retention systems are used to retain internal components (i.e. adapter cards) of an electronic device, such as a workstation computer. A computer has adapter cards of various sizes and weights, which customers can modify to add/change functions of the computer (e.g. by way of adding or swapping adapter cards). In general, these cards (generally referred to as Industry Standard Architecture (ISA) or Peripheral Component Interconnect (PCI) adapter cards) have traditionally been small and rather lightweight and thus were easily retained (physically) within the computer, even during shipping. As such, computer manufactures did not have particular difficulties in shipping computers containing various adapter cards, as these lightweight cards tended to stay in place.

In the past, various retention systems have been employed. The cards have been retained with screws. The longer cards were retained both at the front and the rear using a card guide in the front, sometimes a latching mechanism, sometimes not, and a screw at the rear of the chassis. In some computers, there was a screw along the back wall that was removed, and then a user could pop the card out. In newer computers, rather than use a screw, some sort of retaining mechanism along the back wall is used.

The trend in the industry has been to add tool-less features to the mechanical retention systems to make it easier for customers to remove, replace or install adapter cards of their choice. Additionally, the trend in card size has been towards larger, heavier adapter cards. Some cards are half height (e.g. a network card) and consequently are lightweight. Increasingly though, some cards are quite heavy (e.g. two pounds (2 lbs.)). Cards that are larger and heavier can be full height and/or full length and/or double wide. In fact, some cards have their own cooling schemes, e.g. heat sinks, etc., which further increase the weigh of the overall arrangements.

Accordingly, manufacturers have run in to trouble when shipping computers with these larger and consequently heavier cards. A light card is generally not an issue in terms of retaining it in the connector on the motherboard, snuggly up against the chassis. However, the heavier a card gets, the larger its inertia is. Thus, when it comes to shipping a computer, getting the computer to the customer in working condition is sometimes difficult, as the heavier cards have a tendency to disconnect during shipping and can even cause damage to other components of the computer.

Manufacturers attempt to anticipate difficulties in shipping computers, such as drops and vibrations. A number of different means have been employed to help ensure that computers arrive to customers in working condition. One is the carton and the foam that are used to absorb shock energy encountered during shipping inside the carton. This approach, however, does not address the difficulty of keeping the ever larger and heavier adapter cards firmly connected to the motherboard during shipping, avoiding damage to the computer.

When a computer is dropped during shipping, the consequences can be severe when the computer contains heavy adapter cards. In this case of a drop, the computer (and any cards therein) is going to accelerate towards the ground, having inertia, which has to be stopped through deceleration. Of course, the stop comes when the computer hits something (e.g. the ground), abruptly decelerating the computer, but not necessarily the card(s) contained therein. The cards also need to decelerate, but tend to continue along their path and damage (e.g. deform or warp) a computer component (e.g. a rail of the computer) before coming to rest. As a rough estimate, the force (expressed in pounds exerted on an adjacent computer component) required to stop a heavy card (e.g. a card which weighs approximately 2 lbs.) in such a drop to the ground is approximately 200 lbs. Thus, manufacturers have to somehow stop the heavy card (e.g. a graphics card) from moving the retention assembly, disengaging from its card connector, or otherwise coming loose and becoming non-functional, potentially damaging the computer by warping or deforming the computer chassis.

Accordingly, a need has arisen for improved tool-less retention systems that adequately retain and decelerate the heavy adapter cards within a computer.

SUMMARY OF THE INVENTION

At least one presently preferred embodiment of the invention broadly contemplates a tool-less retention system that appropriately distributes load via various distributed load points to prevent damage caused to a computer by heavy adapter cards. At least one embodiment of the invention includes a tool-less retention system with a balanced distributed load point positioned to contact and transfer G (gravitational) forces to the computer chassis at a region with great resistance to damage (e.g. deformation and/or warping). This region of the computer chassis is adapted to have a support member contacting the balanced distributed load point of the tool-less retainer. The support member is configured within the chassis to adequately absorb the dropping forces placed on it and the underlying chassis, thereby allowing the heavy adapter cards to decelerate appropriately (e.g. when dropped) and avoid damage.

In summary, one aspect of the invention provides an apparatus comprising: a chassis; a tool-less adapter card retainer having a distributed load point configured to engage a predetermined region of the chassis having a support member disposed thereon, the predetermined region of the chassis configured to absorb a dropping force transferred by the distributed load point without deforming.

Another aspect of the present invention provides an apparatus comprising: a processor housed within a chassis of the apparatus; a tool-less adapter card retainer having adapter cards therein and housed within the chassis, the tool-less adapter card retainer having a distributed load point configured to impart force $F_D$ to a support member disposed on a predetermined region of the chassis configured to absorb force $F_D$ without deforming.

A further aspect of the present invention provides an apparatus comprising: a chassis; at least one processor housed with the chassis; and a support member; wherein the support member is disposed on a predetermined region of the chassis configured to absorb a dropping force transferred by a distributed load point of a tool-less adapter card retainer without deforming.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

It will be readily understood that the components of the present invention, as generally described and illustrated in the figures herein, may be arranged and designed in a wide variety of different configurations in addition to the described presently preferred embodiments. Thus, the following more detailed description of the embodiments of the present invention, as represented in the figures, is not intended to limit the scope of the invention, as claimed, but is merely representative of selected presently preferred embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings. The following description is intended only by way of example, and simply illustrates certain selected presently preferred embodiments of the invention as claimed herein.

Figure 1:
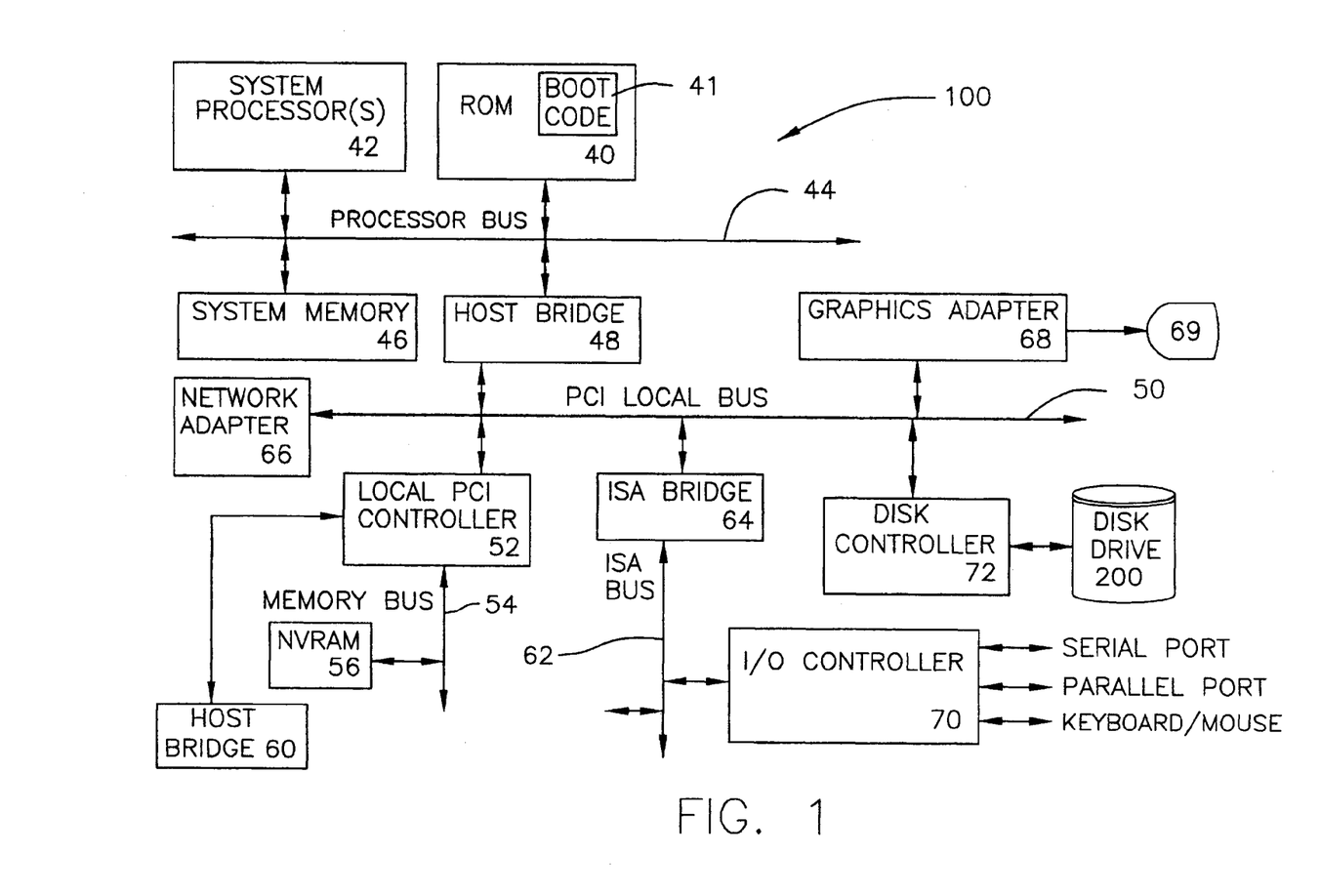
FIG. 1 is a block diagram of a computer system.

Referring now to FIG. 1, there is depicted a block diagram of an illustrative embodiment of a computer system 100. The illustrative embodiment depicted in FIG. 1 may be a workstation computer, such as the Thinkstation®, which is also sold by Lenovo (US) Inc. of Morrisville, N.C. As will become apparent from the following description, however, the present invention is applicable to any electronic device that can benefit from use of a retainer having balanced distributed load points, as herein described.

As shown in FIG. 1, computer system 100 includes at least one system processor 42, which is coupled to a Read-Only Memory (ROM) 40 and a system memory 46 by a processor bus 44. System processor 42, which may comprise one of the processors produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN 10, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a keyboard, mouse, and a disk drive. In addition, I/O controller 70 supports external communication by computer system 100 via serial and parallel ports. The USB Bus and USB Controller (not shown) are part of the Local PCI controller (52).

Figure 2:
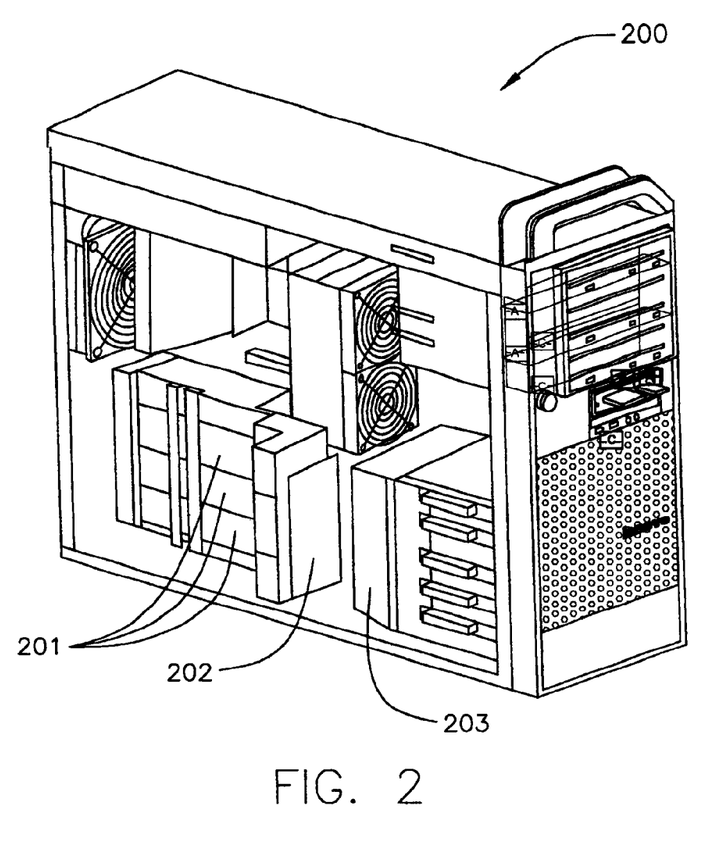
FIG. 2 is a high level view of a computer with a (left) side cover removed, showing a tool-less adapter card retainer.

FIG. 2 is a high level view of a computer (200) (e.g. a workstation) with a (left) side cover removed, exposing certain internal components. The computer (200), among other things, has heavy adapter cards (201) therein. Heavy as used herein is a term meaning heavier than traditional adapter cards (e.g. nVidia® FX 1800 card) and heavy enough, e.g. approximately two pounds 2 lbs., to create problems (e.g. disconnection and damage, e.g. deforming and/or warping of the computer chassis) when the computer (200) is dropped during shipping. An example of a heavy card is a graphics card with a weight of approximately 2 lbs., such as the nVidia Quadro® 4800 cards. The heavy cards (201) are held within a tool-less retainer (202) which permits the heavy cards (201) to be connected to the motherboard of the computer (200) via the card guide (203), which acts as a slot into which the heavy cards (201) are placed during installation.

Figure 3:
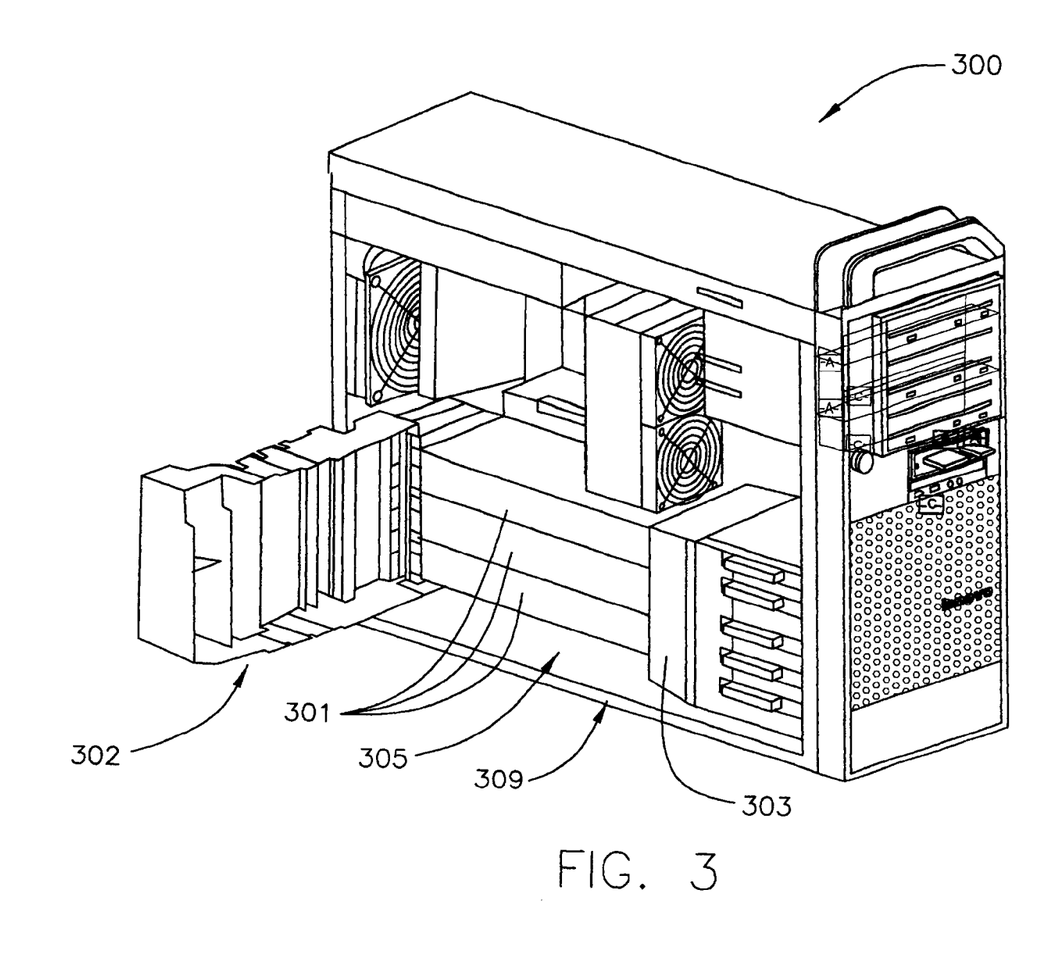
FIG. 3 shows a computer in which the tool-less retainer is pivoted open rather than engaged.

FIG. 3 shows the computer (300) in which the tool-less retainer (302) is pivoted open rather than engaged. The tool-less retainer (302) is configured to pivot open, without the use of a tool, in order to allow access to the heavy cards (301) and insert and/or remove the heavy cards (301) from the card guide (303). The tool-less retainer (302) can then be pivoted back about hinges to engage the main computer chassis. The computer (300) is thus configured to afford the customer ease of use in as much as being able to install and remove these cards without tools.

Figure 4:
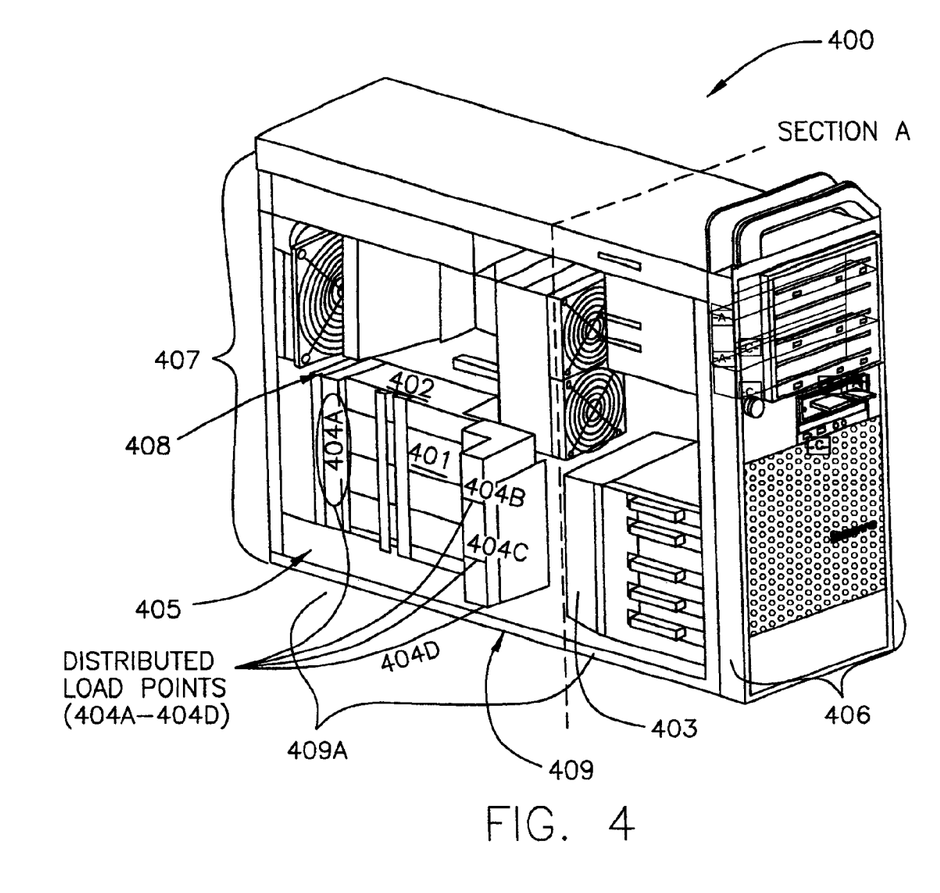
FIG. 4 shows a computer having a tool-less retainer with the distributed load points in a first configuration.

FIG. 4 shows a computer (400) having a tool-less retainer (402) with the distributed load points (404A-D) in a first configuration. At distributed load point (404A) (in the oval region) an axle (408) is positioned to hingedly tie the tool-less retainer (402) to the chassis (405). Two other distributed load points (404B, 404C), are configured as semi-cylindrical protrusions of the tool-less retainer (402) acting to distribute point loads to the left cover (which has been removed so as to present an unobstructed view).

Figure 5:
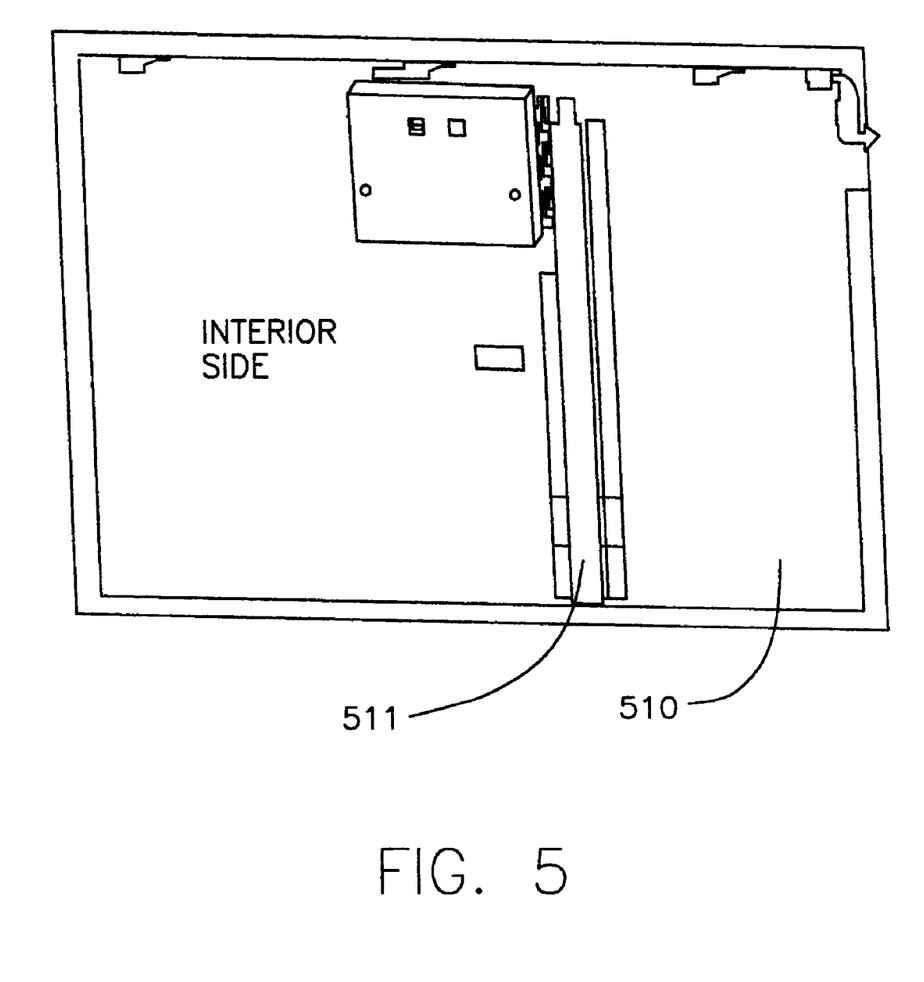
FIG. 5 shows a view of the inside of a (left) cover of the computer.

FIG. 5 shows a view of the inside of the left cover (510). This cover (510) (removed in FIGS. 2-4) accepts point loads from two of the distributed load points (404B, 404C). The left cover (510) has a shock load beam (511) disposed on the inside surface. The shock load beam (511) acts to accept the point loads from the distributed load points (404B, 404C) on the tool-less retainer (402), such as when the computer (400) is dropped on the left side (407).

In order for a manufacturer to keep the heavy cards (401) engaged to the motherboard and supported through card guide (403) and avoid damage during shipping (e.g. if the computer is dropped), the heavy cards (401) must decelerate at the same rate as the computer (400) decelerates. Otherwise, as described, the heavy cards (401) are going to keep moving, impacting and deforming the chassis of the computer (405) via force transfer through the distributed load points (404A-D).

As a non-limiting example, it has been discovered to be particularly problematic if the computer (400) is dropped on its left side (407). If the computer (400) is dropped on its left side (407) (relative to its front side (406)) G forces are applied towards the left side (407) via the distributed load points (404A-D). A card (401) weighing approximately 2 lbs. can exert as much as 200 lbs. of force trough distributed load point (404D) on the bottom rail (409) of a computer chassis (405) when dropped from a height of only 36 inches (duration of impact assumed to be 10 ms).

Distributed load point (404D) is an angular shaped protrusion that extends from the bottom of the tool-less retainer (402). As such, when pivoting the tool-less retainer (as shown in FIG. 3), the distributed load point (404D) must be lifted over rail (409) of the computer chassis (405).

Distributed load point (404D) is the distributed load point that happens to be positioned at the weakest of all contact points on the chassis (405), i.e. the rail (409). This is because distributed load point (404D) is not appropriately placed to achieve proper load balancing. As noted in the above example, during a drop of the computer (400) on its left side (407), too much force is transferred to the rail (409) that cannot absorb the dropping force. The result is often a damaged (e.g. deformed and/or warped) rail (409).

Figure 6:
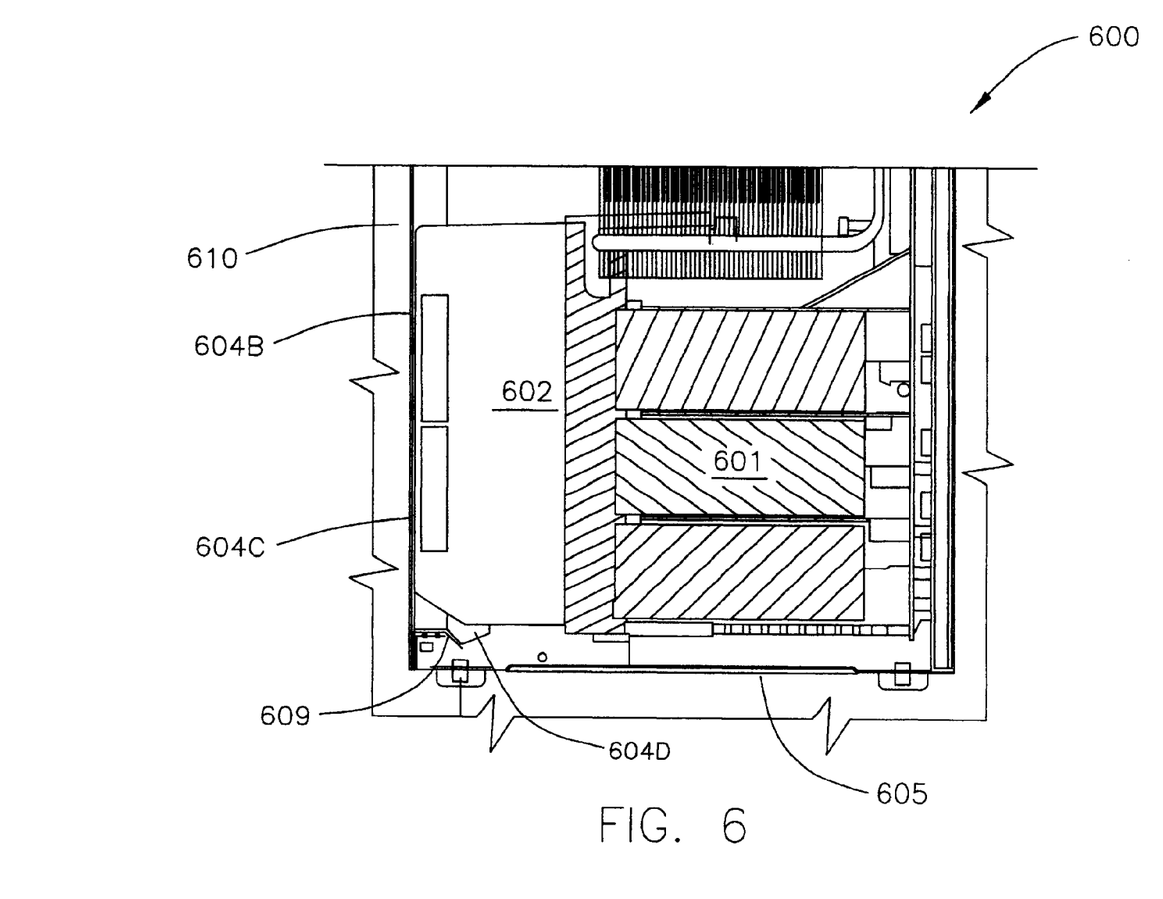
FIG. 6 shows a cross section of a computer, as viewed from the front side, providing a view of internal components.

FIG. 6 shows a cross section of FIG. 4 taken at Section a, as viewed from the front side (406). The heavy cards (601) are again depicted in the tool-less retainer (602). As can be seen, the left side cover (610) of the computer chassis (605) contacts distributed load points (604B, 604C), whereas the bottom rail (609) contacts distributed load point (604D). As mentioned, using this first arrangement, an unacceptably high amount of force (e.g. approximately 50 G/200 lbs) is generated through distributed load point (604D) and applied to rail (609) when the computer is dropped. This results in damage to the bottom rail (609), which is often warped/deformed when the computer (600) is dropped (e.g. on the left side).

Figure 7:
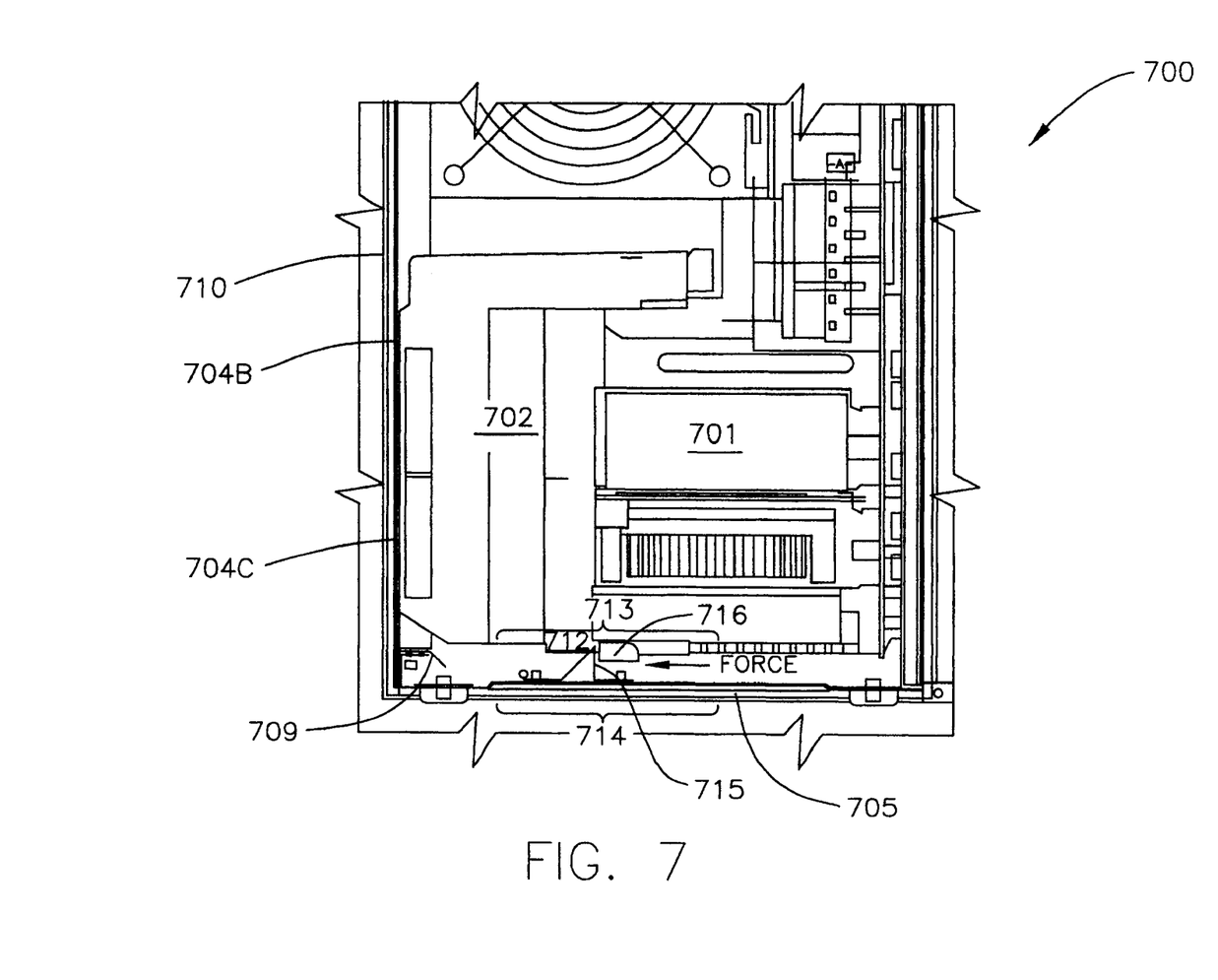
FIG. 7 shows a tool-less retention system with a balanced load point arrangement according to an embodiment of the instant invention.

FIG. 7 depicts a balanced tool-less retention system according to an embodiment of the instant invention. Again, the view depicted in FIG. 7 is a cross section of computer (700), taken at Section a, as shown in FIG. 6. However in FIG. 7 the tool-less retention system is properly load balanced to absorb forces encountered when the computer (700) is dropped, as described below.

In FIG. 7, a heavy card (701) is shown in the tool-less retainer (702). The tool-less retainer (702) contacts the chassis (705) of the computer (700) via distributed load points (704B-704C, 712). The tool-less retainer (702) again contacts the left side cover (710) at distributed load points (704B, 704C). However, rather than the tool-less retainer having an angular protrusion distributed load point (604D) contact the chassis (705) of the computer (700) at the old contact point on the rail (709), a balanced distributed load point (712) is implemented instead.

The balanced distributed load point (712) of the tool-less retainer (702), as shown in FIG. 7, is positioned at a bottom-central location of the tool-less retainer (702) so as to contact the bottom of the computer chassis (705) in a bottom-central region (714). This bottom-central region (714) of the chassis (705) is particularly preferred as it has a higher second moment of area than the conventional contact point (i.e. the rail (709)), and can thus readily resist damage.

Accordingly, the bottom central region (714) is highly resistant to damage (e.g. deformation and/or warping) caused by a variety of forces, particularly those found to be problematic for the rail (609), i.e. as encountered when the computer is dropped with the left side down. Thus, the bottom central region (714) of the chassis can absorb a dropping force substantially parallel to the internal surface of the bottom central region of approximately 50 G without being damaged. However, the exact position of the contact, e.g. in the bottom-central region (714) as depicted in FIG. 7, is less important than the choice of a sturdy (i.e. highly resistant to warping/deformation) portion of the chassis (705). Accordingly, other portions of the main chassis (705) would be suitable.

Thus, as a non-limiting example, a dropping force substantially parallel to the internal surface of the bottom portion of the chassis (705), as encountered when the computer is dropped on the left side cover (710) during shipping, is transferred not to the rail (709) but rather to the bottom-central region (714). This bottom-central region is capable of absorbing much more of such a force without incurring damage than is the rail (709).

As depicted in FIG. 7, the balanced distributed load point (712) contact has been transferred from the rail (709) of the chassis (705) down to the bottom-central region (714) of the chassis (705). The tool-less retainer (702), rather than having an angular protrusion (604D) (contacting the rail (709)), has a balanced distributed load point (712) located in the bottom-central location (713) of the tool-less retainer (702) that contacts a support member piece (715), attached (e.g. through rivets) to the bottom-central region (714) of the chassis (705). Again, the exact positioning of the support member piece (715) is less important than the choice of a sturdy (i.e. highly resistant to warping/deformation) position on the main chassis (705). Accordingly, other portions of the main chassis (705) would be suitable.

As a non-limiting example, the support member piece (715) can be a triangular shaped piece made from sheet metal, stamped into a saw tooth shape, and riveted to the bottom-central region (714) of the chassis (705), as shown in FIG. 7. The balanced distributed load point (712) is shaped so as to provide adequate retention and cooperate with the support member piece (715) during pivoting.

Accordingly, the tool-less retainer's (702) balanced distributed load point (712) comprises a protrusion (716) located on a (right) side of the balanced distributed load point (712), which contacts an uppermost portion of the support member (715). The protrusion (716) acts to transfer point loads to support member (715) during certain drops (e.g. a drop with the left side down). The protrusion (716) also acts in part to keep the tool-less retainer (702) engaged, but is small enough such that a lifting of the tool-less retainer (702) away from the chassis (705) bottom allows for pivoting the tool-less retainer (702) about the hinges, as depicted in FIG. 3. Thus, the tool-less retainer (702) can clear the support member piece (715) in order to disengage and pivot open.

Placing a balanced distributed load point (712) in the bottom of the tool-less retainer (702) so as to contact the support member piece (715) as shown and described is particularly advantageous over other arrangements, e.g. having a distributed load point (604D) contacting the rail (609). The advantages stem from the fact that the rail (609) is a particularly week component to transfer a point load to, particularly a dropping force encountered when the computer is dropped during shipping. This is because the rail (609) is essentially exposed, being supported only at its ends and not at its middle, especially when packaging foam is placed at the front and rear of the computer in the shipping carton.

The rail (609) must therefore be able to support the heavy adapter cards (601) and any other components and additional loads experienced during shipping. Thus, the middle portion of the rail (409a) tends to deform or warp when the computer is dropped during shipping. This has become particularly apparent in relation to the computer being dropped on its left side. Thus, placing the support member piece (715) at the bottom-central region (714) of the chassis (705) transfers the force not to the rail (709) but to the bottom-central region (714). The bottom-central region (714) is much more capable of withstanding the point load of a dropping force (up to 50 G (50 times gravitational force)) created by the balanced distributed load point (712) via protrusion (716) during a drop on the left side cover (710).

The dropping force is a force (for example force $F_D$) produced when the computer having heavy adapter cards therein is dropped during shipping. Force $F_D$ is defined herein as: a force of up to 50 G produced upon dropping the computer from a height of approximately 36 inches, imparted (by an adapter card retainer distributed load point) parallel to a plane coincident with a surface of a predetermined region of the chassis having the support member disposed thereon.

Figure 8:
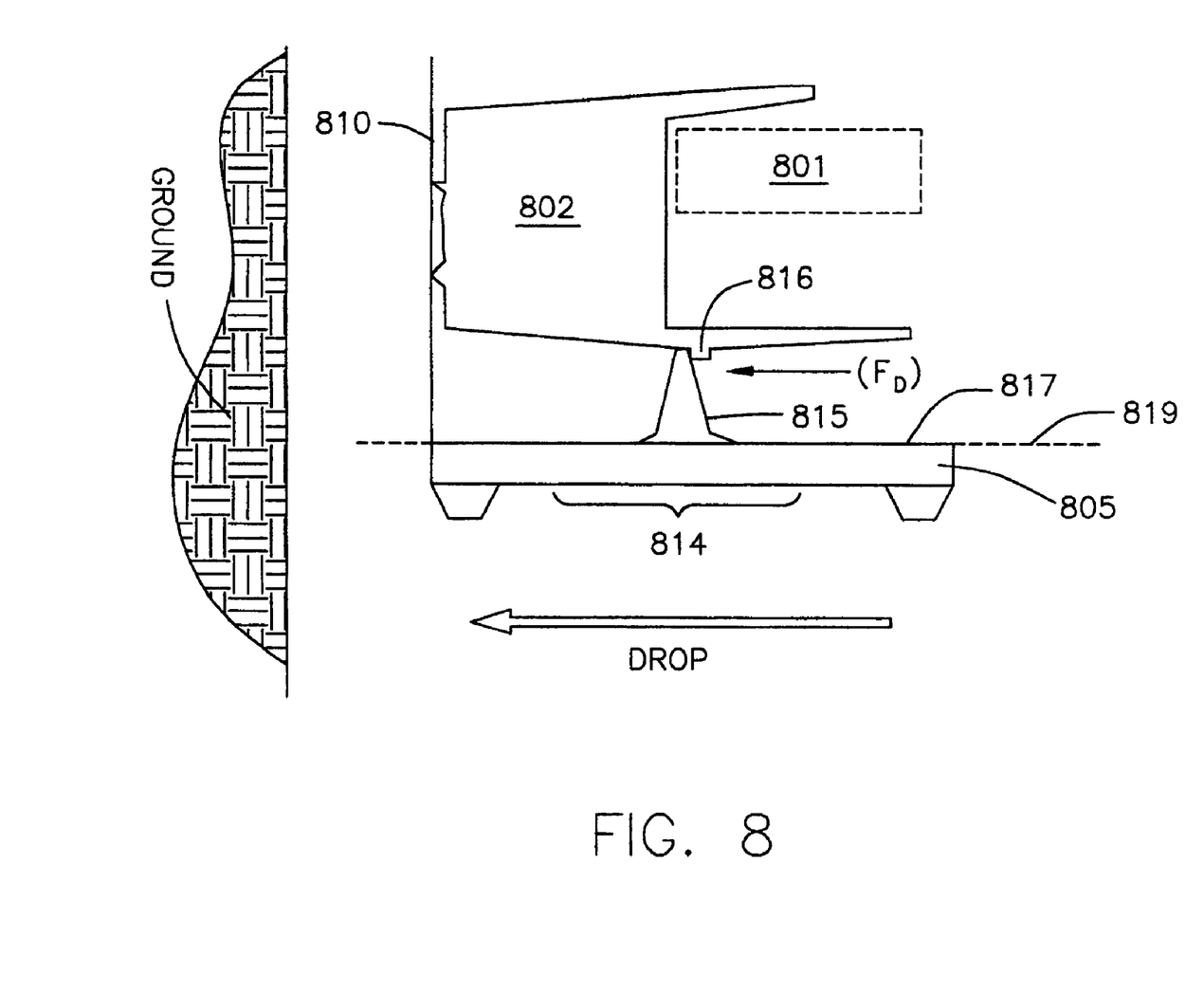
FIG. 8 illustrates a dropping force $F_D$.

FIG. 8 illustrates an example of force $F_D$ produce by a drop onto the left side cover (810). Force $F_D$ is transferred by the protrusion (816) of the distributed load point of the retainer (802) to the upper portion of the support member (815), which is disposed on the bottom-central region (814) of the chassis (805). The majority of the force $F_D$ is attributable to the heavy adapter card(s) (801). Force $F_D$ is imparted to the support member (815) parallel to the plane (813) coincident with the surface (817) of the predetermined region (e.g. (814) of the chassis (805) having the support member (815) disposed thereon. Damage to the computer chassis is avoided because the predetermined region of the chassis (805) is configured to absorb force $F_D$ without deforming and/or warping. This is accomplished by choosing a predetermined area with a high second moment of area (e.g. as compared to the rail).

In brief recapitulation, at least one presently preferred embodiment of the invention provides a tool-less retention system that appropriately distributes load via various load points to prevent damage (e.g. as caused to a computer by heavy adapter cards) during shipping. The invention provides a tool-less retention system with a balanced load point of a tool-less retainer configured to contact the computer chassis via a support member placed at a region with great resistance to damage (e.g. warping and/or deformation).

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

In the drawings and specification there has been set forth a preferred embodiment of the invention and, although specific terms are used, the description thus given uses terminology in a generic and descriptive sense only and not for purposes of limitation.

If not otherwise stated herein, it is to be assumed that all patents, patent applications, patent publications and other publications (including web-based publications) mentioned and cited herein are hereby fully incorporated by reference herein as if set forth in their entirety.

What is claimed is:

1. An apparatus comprising:
   a chassis;
   a tool-less adapter card retainer having a distributed load point configured to engage a predetermined region of the chassis having a support member disposed thereon, the predetermined region of the chassis configured to absorb a dropping force transferred by the distributed load point without being damaged;
   wherein a top surface of the support member contacts a bottom surface of the tool-less adapter card retainer and a protrusion of the distributed load point contacts a side surface of the support member.

2. The apparatus according to claim 1, wherein the support member is configured to reversibly engage the distributed load point.

3. The apparatus according to claim 1, wherein the predetermined region comprises a bottom-central region of the chassis.

4. The apparatus according to claim 1, wherein the predetermined region has a higher second moment of area than a rail of the chassis.

5. The apparatus according to claim 1, wherein the apparatus further comprises a heavy graphics card contained within the tool-less adapter card retainer.

6. The apparatus according to claim 1, wherein the apparatus further comprises a plurality of heavy graphics cards contained within the tool-less adapter card retainer.

7. The apparatus according to claim 1, wherein the dropping force is at least 40 G.

8. The apparatus according to claim 1, wherein the dropping force is at least 50 G.

9. An apparatus comprising:
   a processor housed within a chassis of the apparatus;
   a tool-less adapter card retainer having adapter cards therein and housed within the chassis, the tool-less adapter card retainer having a distributed load point configured to impart force $F_D$ to a support member disposed on a predetermined region of the chassis configured to absorb force $F_D$ without being damaged;
   wherein a top surface of the support member contacts a bottom surface of the tool-less adapter card retainer and a protrusion of the distributed load point contacts a side surface of the support member.

10. The apparatus according to claim 9, wherein the support member is configured to reversibly engage the distributed load point.

11. The apparatus according to claim 9, wherein the predetermined region comprises a bottom-central region of the chassis.

12. The apparatus according to claim 9, wherein the apparatus further comprises a heavy graphics card contained within the tool-less adapter card retainer.

13. The apparatus according to claim 9, wherein the apparatus further comprises a plurality of heavy graphics cards contained within the tool-less adapter card retainer.

14. The apparatus according to claim 9, wherein force $F_D$ is at least 30 G.

15. The apparatus according to claim 9, wherein force $F_D$ is at least 40 G.

16. The apparatus according to claim 9, wherein force $F_D$ is at least 50 G.

17. An apparatus comprising:

a chassis;

at least one processor housed with the chassis; and a support member;

wherein the support member is disposed on a predetermined region of the chassis configured to absorb a dropping force transferred by a distributed load point of a tool-less adapter card retainer without being damaged;

wherein a top surface of the support member contacts a bottom surface of the tool-less adapter card retainer and a protrusion of the distributed load point contacts a side surface of the support member.

18. The apparatus according to claim 17, wherein the side cover is a removable cover covering a side portion of the apparatus that when removed exposes internal components of said apparatus and allows said tool-less adapter card retainer to be swung open about a hinge portion.

* * * * *